2 Sheets—Sheet 1.

T. F. OSBURN.
Sawing-Machine.

No. 200,751. Patented Feb. 26, 1878.

WITNESSES:
Henry N. Miller
C. Sedgwick

INVENTOR:
T. F. Osburn
BY Munn & Co.
ATTORNEYS.

2 Sheets—Sheet 2.

T. F. OSBURN.
Sawing-Machine.

No. 200,751. Patented Feb. 26, 1878.

WITNESSES:
Henry N. Miller
C. Sidgwick

INVENTOR:
T. F. Osburn
BY Munn & Co.
ATTORNEYS.

UNITED STATES PATENT OFFICE.

THOMAS F. OSBURN, OF JERSEYVILLE, ILLINOIS.

IMPROVEMENT IN SAWING-MACHINES.

Specification forming part of Letters Patent No. 200,751, dated February 26, 1878; application filed December 22, 1877.

*To all whom it may concern:*

Figure 1:
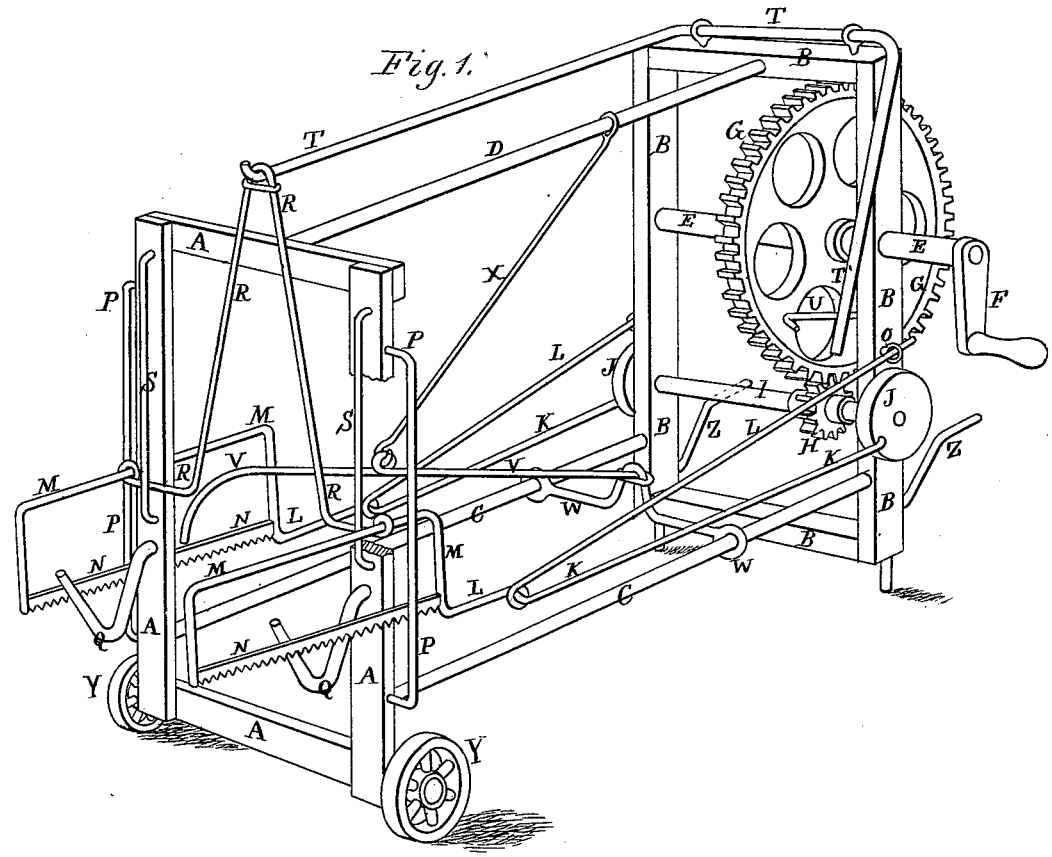
Figure 2:
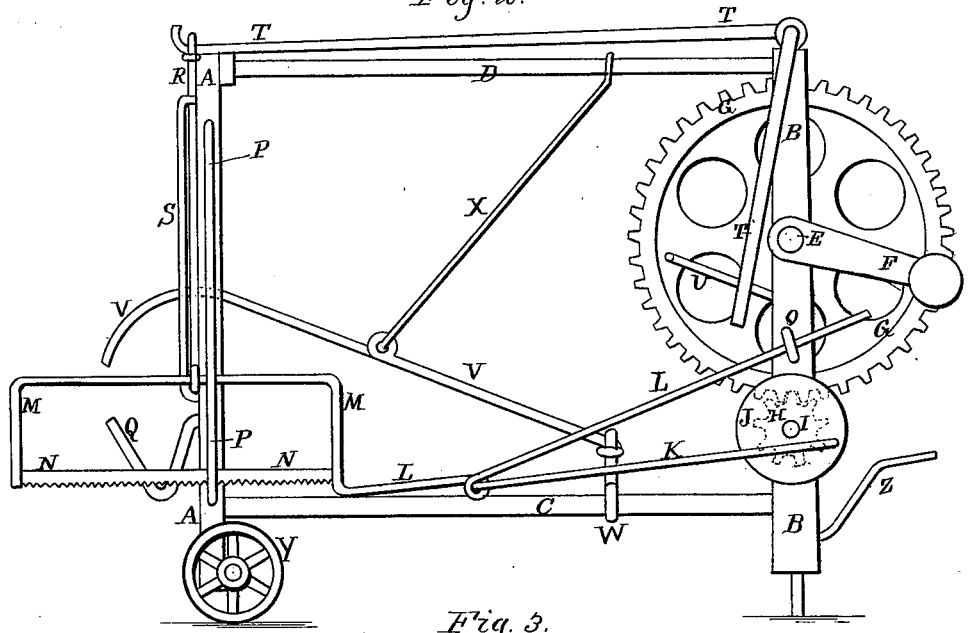
Figure 3:
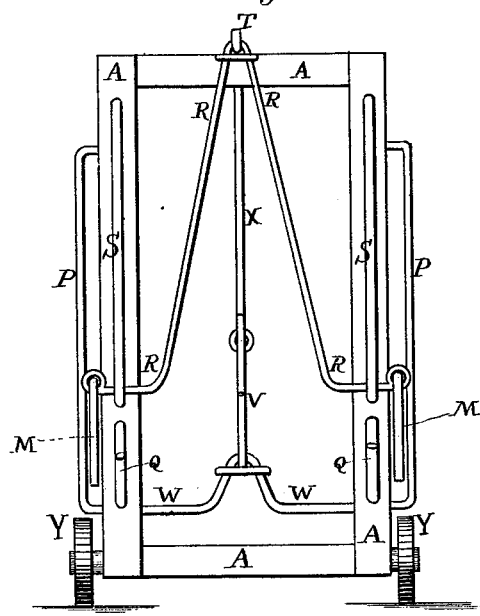

Be it known that I, THOMAS FERRIER OSBURN, of Jerseyville, in the county of Jersey and State of Illinois, have invented a new and useful Improvement in Gang Wood-Saws, of which the following is a specification:

Figure 1, Sheet 1, is a perspective view of my improved machine, part being broken away to show the construction. Fig. 2, Sheet 2, is a side view of the same. Fig. 3, Sheet 2, is a front view of the same.

Similar letters of reference indicate corresponding parts.

The object of this invention is to furnish an improved machine which shall be so constructed as to make two cuts at the same time, which shall be simple in construction, and easily operated, and which may be readily moved from place to place.

The invention will first be described in connection with the drawing, and then pointed out in the claims.

A and B are the end frames, which are connected near their lower ends by two bars, C, and at the center of their upper ends by a bar, D. To the upper parts of the side bars of the rear frame B is pivoted a shaft, E, to one or both ends of which is attached a crank, F, for operating the machine. To the shaft E is attached a large gear-wheel, G, the rim of which is made heavy, to adapt it to serve as a balance-wheel, and the teeth of which mesh into the teeth of a small gear-wheel, H, attached to the shaft I.

The shaft I revolves in bearings attached to the lower part of the side bars of the frame B, and to its ends are attached two crank-wheels, cranks, or eccentrics, J, to which are pivoted or connected the rear ends of the connecting-rods K.

The forward ends of the rods K are pivoted to the rods L, attached to or forming a continuation of the frames M to which the saws N are attached. The rear ends of the rods L slide in guide-eyes or keepers O, attached to the side bars of the rear frame B.

The saw-frames M pass through keepers P, attached to the side bars of the front frame A, and which are made long, so that the saws may be raised to allow the wood to be placed upon the angular bars Q, attached to the side bars of the said frame A.

The saw-frames M pass through eyes formed upon the ends of the rod R, which ends pass through long keepers S, attached to the side bars of the frame A.

The middle part of the rod R is bent upward into V form, and its angle or loop rises above the top of the frame A, and is hooked upon the forward end of the rod T.

The rod T extends back to the top bar of the rear frame B, is bent at right angles, and works in eyes or bearings attached to the said top bar. The rod T is again bent at right angles, and extends down along the side bar of the frame B, so that it can be conveniently operated by the sawyer to raise the saws, when required.

U is a catch-bar attached to the side bar of the frame B, to receive the lever T' and hold the saws raised.

The stick of wood is held down upon the bent bars Q while being sawed by the rod V, the rear end of which is pivoted to a cross-bar, W, the ends of which are attached to the side bars C.

To the rod V is pivoted the lower end of the rod X, the upper end of which has an eye formed upon it to receive and slide upon the rod D, so that the holding-rod V may be pressed down upon the stick and raised from it by sliding the rod X upon the rod D.

The holding-rod V may be arranged to be operated by a treadle, if desired.

To the lower part of the front frame A are pivoted two small wheels, Y, and to the rear frame B are attached two handles, Z, so that the machine may be readily moved from place to place in the manner of a wheelbarrow.

If desired, the saws N may be run without frames M, in which case the keepers P and the lifting-rod R will be connected with the guide-rods L of the said saws.

Having thus described my invention, I claim as new and desire to secure by Letters Patent—

1. The combination, in a frame, A B C D, with two saws, N, of the slide-rods K L, the former pivoted to the latter, and the latter forming a continuation of the saw-frame M, as shown and described.

2. The combination of the holding-rod V and the adjusting-rod X with the frame A B C D, substantially as herein shown and described.

THOMAS FERRIER OSBURN.

Witnesses:
ROBERT A. KING,
HORATIO N. WYCKOFF.